(12) United States Patent
Miao et al.

(10) Patent No.: US 7,648,548 B2
(45) Date of Patent: Jan. 19, 2010

(54) HIGH POROSITY CORDIERITE COMPOSITION

(75) Inventors: Weiguo Miao, Corning, NY (US); Steven Bolaji Ogunwumi, Painted Post, NY (US); Paul John Shustack, Elmira, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 558 days.

(21) Appl. No.: 11/432,038

(22) Filed: May 10, 2006

(65) Prior Publication Data

US 2007/0261378 A1 Nov. 15, 2007

(51) Int. Cl.
B01D 46/00 (2006.01)
F01N 3/022 (2006.01)
B01D 39/20 (2006.01)

(52) U.S. Cl. .................. 55/523; 55/282.3; 55/385.3; 55/524; 55/DIG. 5; 55/DIG. 10; 55/DIG. 30; 60/297; 60/299; 60/311; 422/177; 422/180; 264/41; 264/44; 264/628; 264/631; 264/DIG. 48; 428/116; 95/273

(58) Field of Classification Search ............... 55/282.2, 55/282.3, 385.3, 523, 524, DIG. 5, DIG. 10, 55/DIG. 30; 60/297, 299, 311; 422/177, 422/180; 264/41, 44, 628, 630, 631, DIG. 48; 428/116, 117, 118; 95/273
See application file for complete search history.

(56) References Cited

U.S. PATENT DOCUMENTS

| | | | |
|---|---|---|---|
| 4,250,002 A * | 2/1981 | Lazarz et al. ............... | 205/523 |
| 6,432,856 B1 | 8/2002 | Beall et al. .................. | 501/118 |
| 6,773,481 B2 | 8/2004 | Noguchi et al. ............... | 55/523 |
| 6,814,774 B2 | 11/2004 | Ishihara et al. ................ | 55/523 |
| 6,818,580 B2 | 11/2004 | Kumazawa et al. ......... | 501/119 |
| 6,827,754 B2 | 12/2004 | Suwabe et al. ................ | 55/523 |
| 6,864,198 B2 | 3/2005 | Merkel ........................ | 501/80 |
| 2003/0039598 A1 | 2/2003 | Nishimura et al. .......... | 422/177 |
| 2004/0152593 A1 | 8/2004 | Cutler et al. ................. | 502/439 |
| 2004/0261384 A1* | 12/2004 | Merkel et al. ................. | 55/523 |
| 2005/0069469 A1 | 3/2005 | Fu et al. ...................... | 422/177 |

FOREIGN PATENT DOCUMENTS

| | | |
|---|---|---|
| EP | 0 753 490 | 1/2000 |
| WO | 2004/002608 | 1/2004 |
| WO | 2007/064497 | 6/2007 |

OTHER PUBLICATIONS

U.S. Appl. No. 11/316,294, Addeigo, filed Dec. 21, 2005.

* cited by examiner

*Primary Examiner*—Jason M Greene
(74) *Attorney, Agent, or Firm*—Matthew B. McNutt

(57) ABSTRACT

Disclosed are ceramic articles, which in one aspect are composed predominately of a cordierite having a composition close to that of $Mg_2Al_4Si_5O_{18}$. The ceramic articles possess a microstructure characterized by a unique combination of relatively high porosity and relatively narrow pore size distribution, both as measured by mercury porosimetry, that render the ceramic structure useful for ceramic filter applications requiring high thermal durability and high filtration efficiency coupled with low pressure drop along the length of the filter. Such ceramic bodies are particularly well suited for filtration applications, such as diesel exhaust filters or DPFs. Also disclosed are methods for the manufacture of the ceramic articles described herein.

19 Claims, 6 Drawing Sheets

HIGH POROSITY CORDIERITE COMPOSITION

BACKGROUND OF THE INVENTION

1. Field of the Invention

The present invention relates to ceramic articles, and more particularly to ceramic articles having properties suitable for use in exhaust after-treatment applications, particularly diesel exhaust filtration.

2. Technical Background

Recently, much interest has been directed towards the diesel engine due to its efficiency, durability and economical aspects. However, diesel emissions have been scrutinized both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

One of the biggest challenges in lowering diesel emissions is controlling the levels of diesel particulate material present in the diesel exhaust stream. In 1998 diesel particulates were declared a toxic air contaminant by the California Air Resources Board. Legislation has been passed that regulates the concentration and particle size of diesel particulate pollution originating from both mobile and stationary sources.

Diesel particulate material consists mainly of carbon soot. One way of removing the carbon soot from the diesel exhaust is through diesel traps. The most widely used diesel trap is the diesel particulate filter which filters the diesel exhaust by capturing the soot on the porous walls of the filter body. The diesel particulate filter is designed to provide for nearly complete filtration of soot without significantly hindering the exhaust flow. However, as the layer of soot collects on the surfaces of the inlet channels of the diesel particulate filter, the lower permeability of the soot layer causes a gradual rise in the back pressure of the filter against the engine, causing the engine to work harder. Once the carbon in the filter has accumulated to some level, the filter must be regenerated by burning the soot, thereby restoring the back pressure to low levels. Normally, the regeneration is accomplished under controlled conditions of engine management whereby a slow burn is initiated and lasts a number of minutes, during which the temperature in the filter rises from about 400-600° C. to a maximum of about 800-1000° C.

Cordierite, being a low-cost material, in combination with offering a low coefficient of thermal expansion (CTE), has been the material of choice in diesel exhaust filtration. To that end, porous cordierite ceramic filters of the wall-flow type have been utilized for the removal of particles in the exhaust stream from some diesel engines since the early 1980s. A diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost. However, achieving the combination of high filtration efficiency, high strength, and very low pressure drop has proven elusive with cordierite DPFs.

Conventional DPF design has thus required the balancing of several factors, including porosity, pore size distribution, thermal expansion, strength, elastic modulus, pressure drop, and manufacturability. Further, several engineering tradeoffs have been required in order to fabricate a filter having an acceptable combination of physical properties and processability. For example, increased porosity is often attainable through the use of coarser raw materials, the use of pore formers, and or lower sintering temperatures. However, each of these approaches is known to result in an increase in thermal expansion which can compromise the survivability of the filter in the desired application. In addition, the heat capacity and thermal conductivity of the filter generally decreases with increasing porosity, thus leading to higher temperatures and more severe gradients during service.

In order to optimize a filter, the relatively fine porosity which reduces the heat capacity and thermal conductivity should be minimized because these pores can inhibit permeability. However, in order to maintain sufficient filtration efficiency and strength, relatively large pores should also be minimized. Larger pores often have a poor degree of connectivity to one another which has been found to result in clogging of the pores by soot during filtration, causing an undesirable rapid increase in pressure drop with soot loading and corresponding decrease in filtration efficiency.

It would be considered an advancement in the art to obtain an optimized ceramic article, suitable for use in filter applications requiring high thermal durability and high filtration efficiency coupled with low pressure drop along the length of the filter. In particular, there is a need in the art for a ceramic article which possesses a pore microstructure characterized by a relatively high level of porosity, a relatively narrow pore size distribution, and a relatively low coefficient of thermal expansion. To that end, as described below, the present invention provides such bodies and method of making them.

SUMMARY OF THE INVENTION

The present invention relates to ceramic articles, and more particularly to ceramic articles having properties suitable for use in exhaust after-treatment applications, particularly diesel exhaust filtration.

In a first aspect of the present invention there is provided a porous ceramic body having a total porosity greater than 62%. The ceramic body further comprises a controlled pore size distribution having a ($d_{factor}$) less than 0.4, a median pore size greater than 10 microns; and a coefficient of thermal expansion in the axial direction less than $10.0 \times 10^{-7}/°$ C. across the temperature range of from 25° C. to 800° C.

The inventive ceramic bodies are suitable in high temperature applications, and particularly as diesel exhaust filtration devices exhibiting low pressure drops, high filtration efficiency and good strength. To this end, in another aspect, there is provided a ceramic honeycomb body having an inlet end and an outlet end, a multiplicity of cells extending from the inlet end to the outlet end, the cells having porous walls, wherein part of the total number of cells at the inlet end are plugged along a portion of their lengths, and the remaining part of the cells that are open at the inlet end are plugged at the outlet end along a portion of their lengths, so that an engine exhaust stream passing through the cells of the honeycomb from the inlet end to the outlet end flows into the open cells, then through the cells walls, and out of the structure through the open cells at the outlet end.

In another aspect of the present invention there is also provided a method of making a porous ceramic article as described above. The method comprises the steps of providing a plasticized cordierite precursor batch composition containing inorganic ceramic forming batch components; a pore former comprising a potato starch having a having a particle size distribution characterized by $dp_{breadth}$ less than 1.00; a liquid vehicle; and a binder system. A honeycomb green body is then formed from the plasticized ceramic precursor batch composition and subsequently fired under conditions effective to convert the green body into a ceramic honeycomb article. In one aspect, the resulting fired ceramic honeycomb article has a total porosity greater than 62% and a controlled pore size distribution having a ($d_{factor}$) less than 0.4, a median pore size greater than 10 microns; and a coefficient of thermal expansion in the axial direction less than $10.0 \times 10^{-7}/°$ C. across the temperature range of from 25° C. to 800° C.

In still another aspect, the present invention provides the ceramic article produced by the methods described herein.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
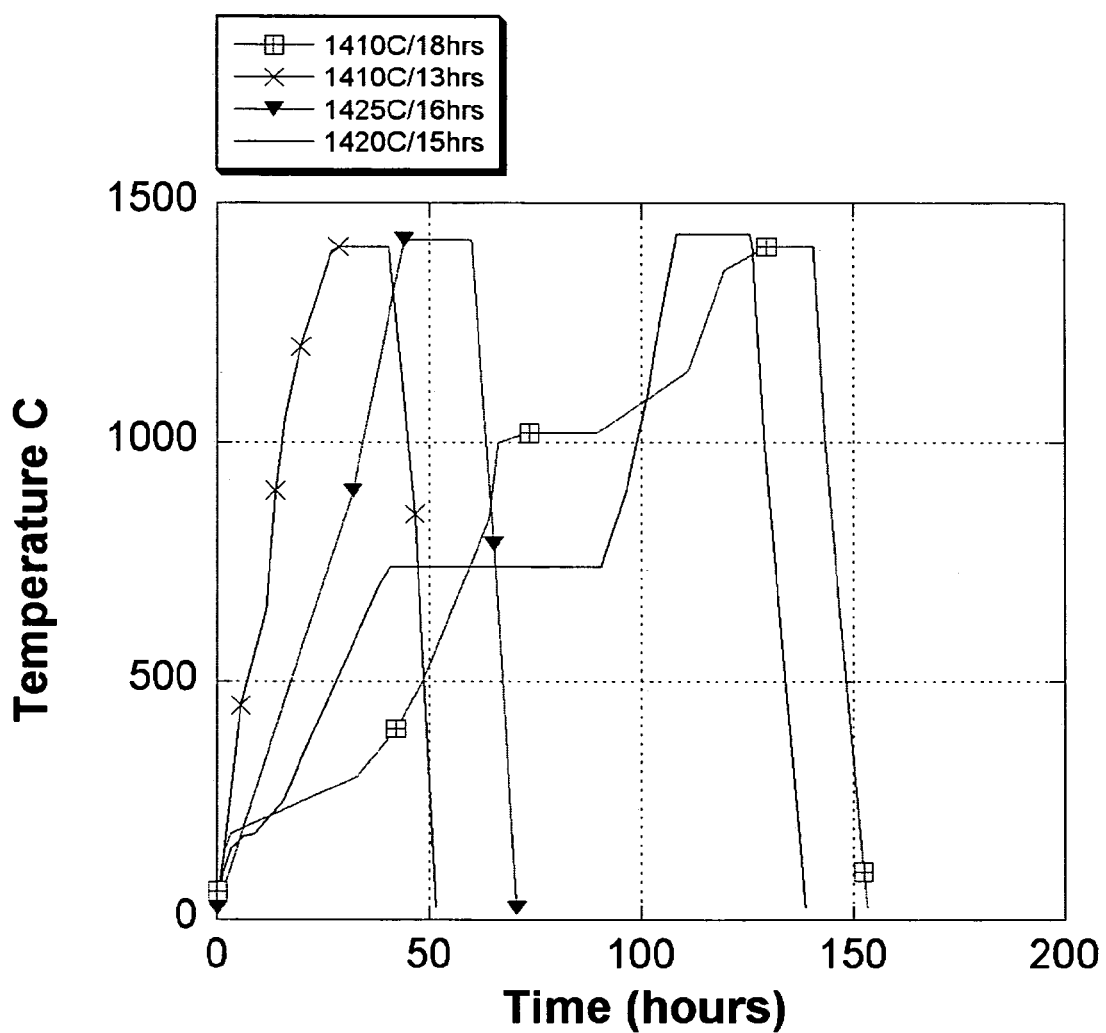
FIG. 1 is a graph illustration depicting the exemplary firing schedules set forth in Table 1.
Figure 2:
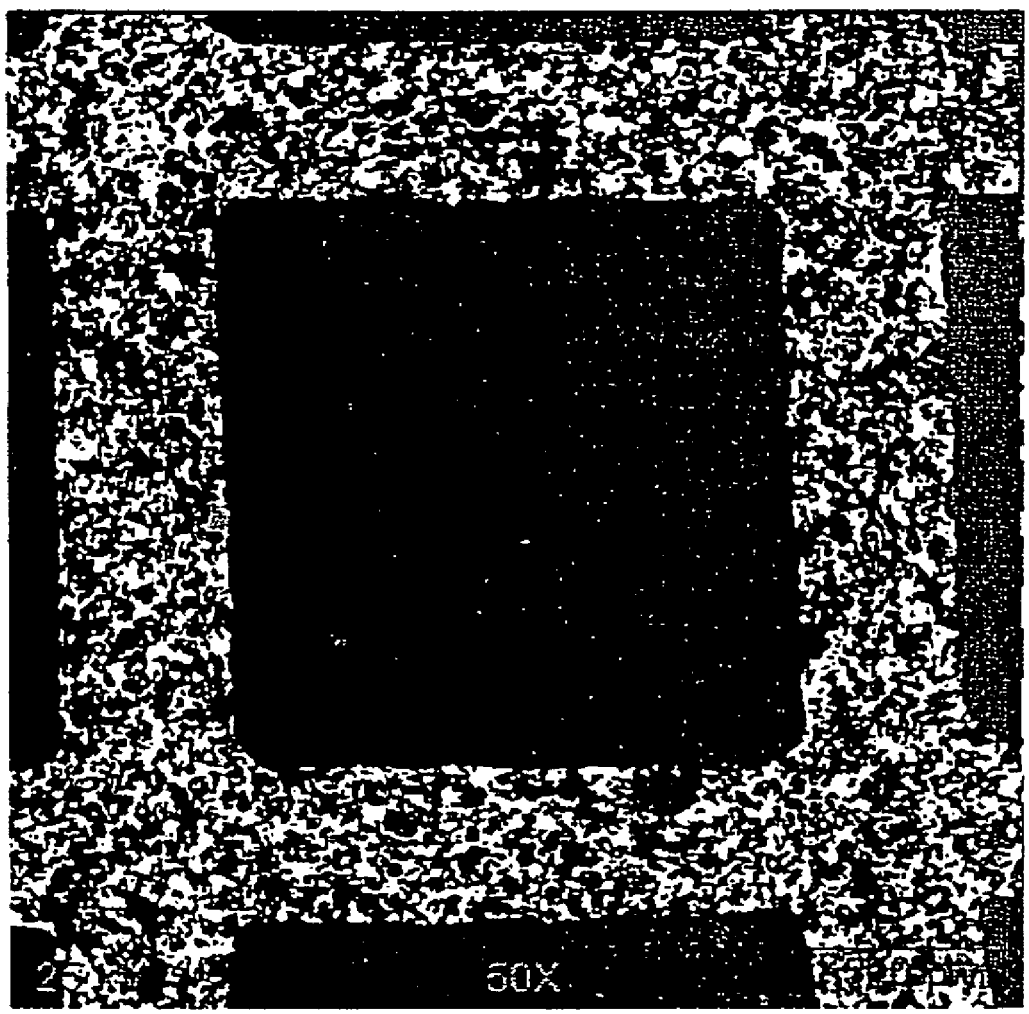
FIG. 2 is an SEM micrograph illustration of an inventive cordierite composition according to one aspect of the present invention.
Figure 3:
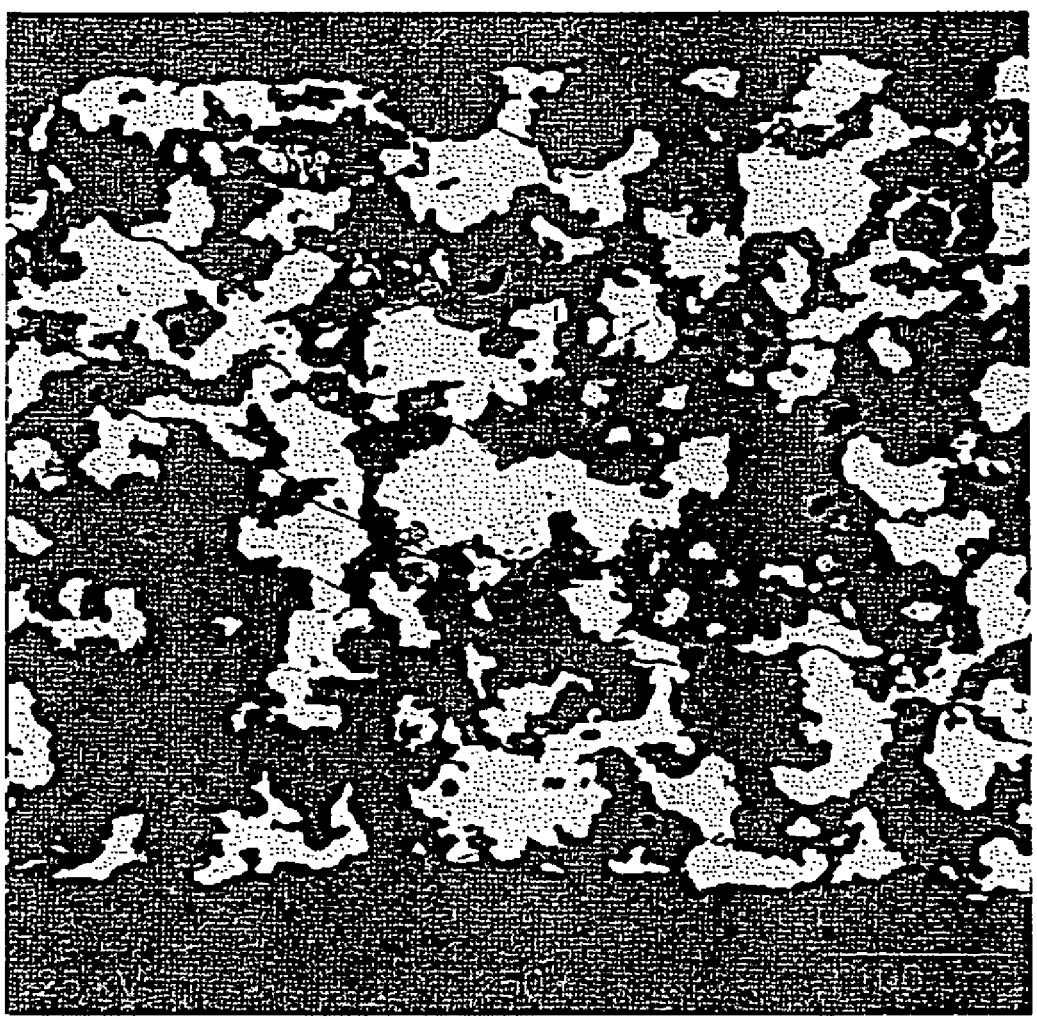
FIG. 3 is an SEM micrograph illustration of an inventive cordierite composition according to one aspect of the present invention.
Figure 4:
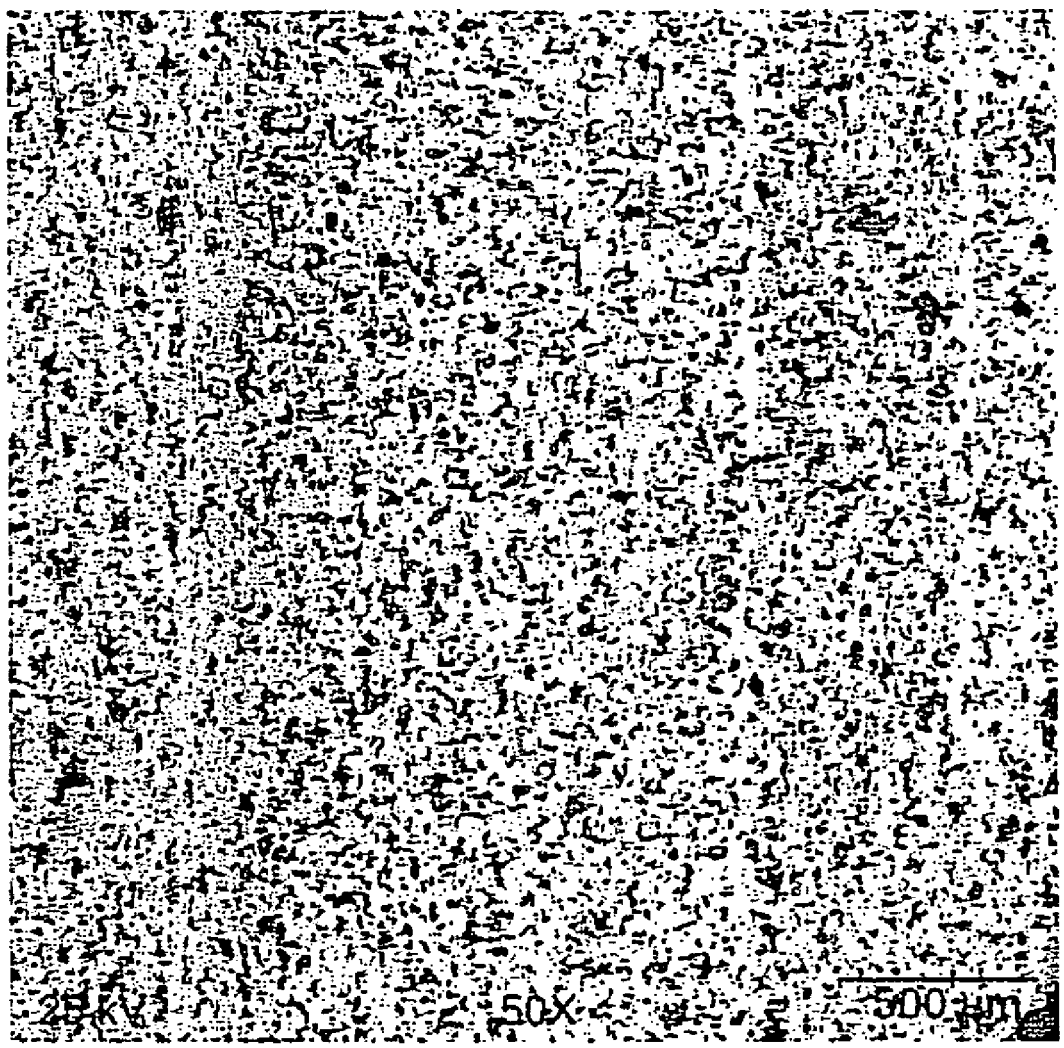
FIG. 4 is an SEM micrograph illustration of an inventive cordierite composition according to one aspect of the present invention.
Figure 5:
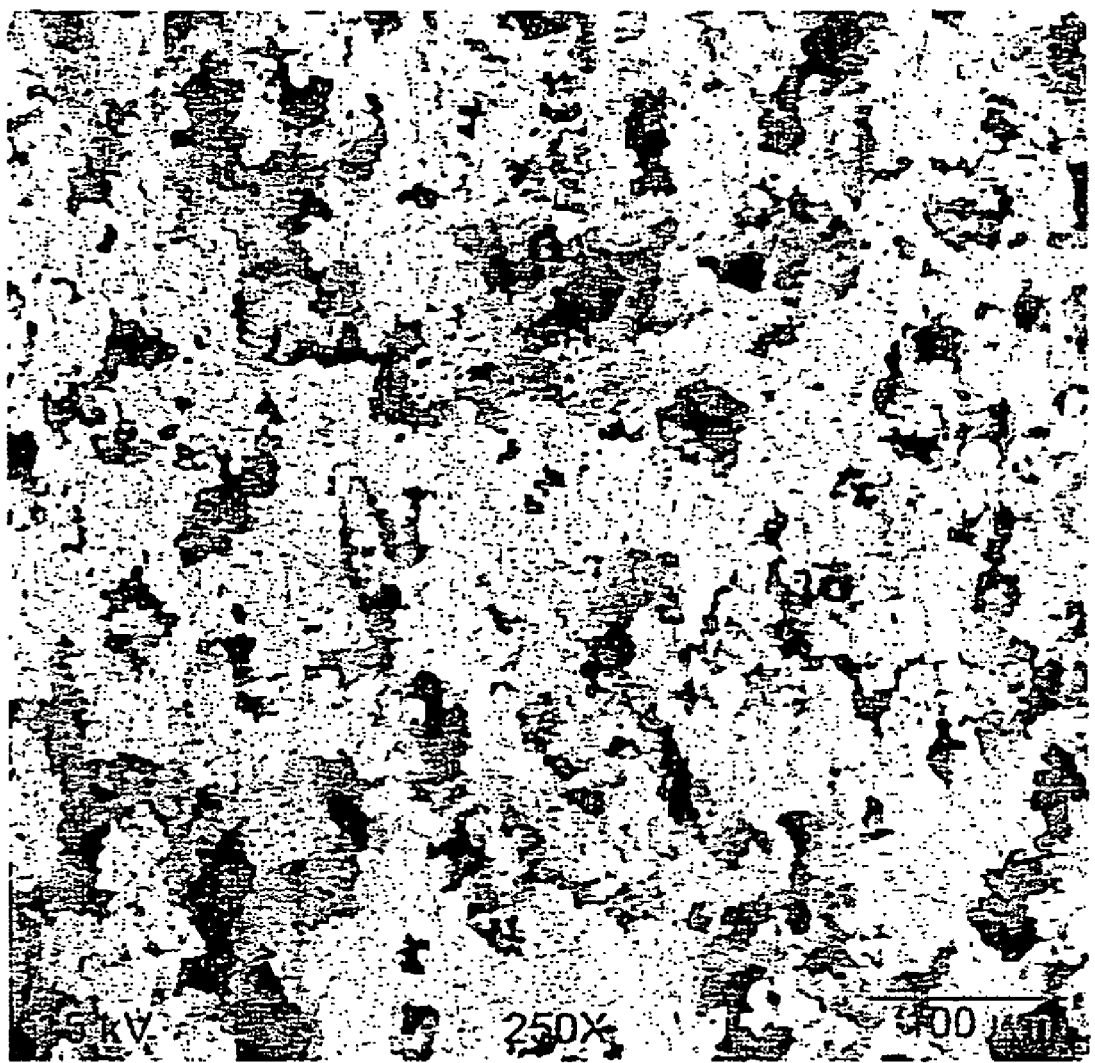
FIG. 5 is an SEM micrograph illustration of an inventive cordierite composition according to one aspect of the present invention.

The present invention can be understood more readily by reference to the following detailed description, examples, and claims, and their previous and following description. However, before the present compositions, devices, and/or methods are disclosed and described, it is to be understood that this invention is not limited to the specific articles, devices, and/or methods disclosed unless otherwise specified, as such can, of course, vary.

As briefly introduced above, the present invention seeks to provide an improved ceramic article useful for ceramic filter applications requiring high thermal durability and high filtration efficiency coupled with low pressure drop along the length of the filter. To this end, a pore microstructure is provided in a fired ceramic body that is characterized by a relatively high level of porosity, a relatively narrow pore size distribution, and a relatively low coefficient of thermal expansion. It has been found that such a microstructure enables higher levels of washcoat loadings to be applied to the filter with a minimal resulting increase in undesired backpressure.

In accordance therewith, the present invention provides a ceramic article, which, in one aspect, is composed predominately of a crystalline phase cordierite composition. The ceramic articles possess a microstructure characterized by a unique combination of relatively high porosity and relatively narrow pore size distribution, both as measured by mercury porosimetry, that render the ceramic structure useful for ceramic filter applications requiring high thermal durability and high filtration efficiency coupled with low pressure drop along the length of the filter. Such ceramic bodies are particularly well suited for filtration applications, such as diesel exhaust filters or DPFs.

In one aspect, the ceramic articles of the instant invention comprise a relatively high level of total porosity. For example, the ceramic articles of the instant invention can comprise a total porosity, % P, greater than 60%, greater than 62% or even greater than 65%. In still another aspect, the total porosity of the ceramic articles can be in the range of from greater than 60% to less then 75%, greater than 62% to less than 75%, or even in the range of from greater than 65% to less than 75%.

In addition to the relatively high total porosities, the cordierite ceramic bodies of the present invention can also comprise a relatively narrow pore size distributions evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity d50 is the median pore size based upon pore volume, and is measured in micrometers; thus, d50 is the pore diameter at which 50% of the open porosity of the ceramic has been intruded by mercury. The quantity d90 is the pore diameter at which 90% of the pore volume is comprised of pores whose diameters are smaller than the value of d90; thus, d90 is also equal to the pore diameter at which 10% by volume of the open porosity of the ceramic has been intruded by mercury. Still further, the quantity d10 is the pore diameter at which 10% of the pore volume is comprised of pores whose diameters are smaller than the value of d10; thus, d10 is equal to the pore diameter at which 90% by volume of the open porosity of the ceramic has been intruded by mercury. The values of d10 and d90 are also expressed in units of micrometers.

The pore fraction d10 can, in one aspect, be at least 4 μm, at least 6 μm, or even at least 8 μm. In another aspect, d10 can be in the range of from 4 μm to 18 μm. In still another aspect, the pore fraction d10 can be in the range of from 6 μm to 15 μm.

The pore fraction d90 can, in one aspect, be at least 20 μm, at least 23 μm, or even at least 25 μm. In another aspect, d90 can be in the range of from 20 μm to 50 μm. In still another aspect, the pore fraction d90 can be in the range of from 25 μm to 40 μm.

The median pore diameter, d50, of the pores present in the instant ceramic articles can, in one aspect, be greater than 10 μm, greater than 15 μm, or even greater than 20 μm. In another aspect, the median pore diameter can be in the range of from 15 μm to 30 μm, including exemplary median pore diameters of at least 17 μm, 19 μm, 21 μm, 23 μm, 25 μm, and 27 μm. In still another aspect, the median pored diameter can be in any range derived from the aforementioned median pore diameters, including for example, in the range of from 15 μm to 25 μm.

The relatively narrow pore size distribution of the inventive ceramic articles can, in one aspect, be evidenced by the width of the distribution of pore sizes finer than the median pore size, d50, further quantified as pore fraction. As used herein, the width of the distribution of pore sizes finer than the median pore size, d50, are represented by a "dfactor" value which expresses the quantity (d50−d10)/d50. To this end, the ceramic structure of the present invention in one aspect comprises a dfactor less than 0.40, less than 0.35, or even less than 0.30. In still another aspect, the ceramic structure of the present invention can comprises a dfactor in the range of from 0.30 to less than 0.40.

The relatively narrow pore size distribution of the inventive ceramic articles can in another aspect also be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{breadth}$" or "$d_B$" value which expresses the quantity $(d_{90}-d_{10})/d_{50}$. To this end, the ceramic structure of the present invention in one aspect comprises a $d_B$ value that is less than 1.50, less than 1.25, less than 1.10, or even less than 1.00.

The ceramic bodies of the present invention can, in another aspect, exhibit a low coefficient of thermal expansion resulting in excellent thermal shock resistance (TSR). As will be appreciated by one of ordinary skill in the art, TSR is inversely proportional to the coefficient of thermal expansion (CTE). That is, honeycomb structures with low thermal expansion have higher thermal shock resistance and can survive the wide temperature fluctuations that are encountered in end use filter applications. Accordingly, in one aspect, the ceramic articles of the present invention are characterized by having an ultra-low coefficient of thermal expansion (CTE) in the axial direction, as measured by dilatometry, that is less than $9.0 \times 10^{-7}/°$ C. across the temperature range of from 25° C. to 800° C., including a CTE that can be less than $8.0 \times 10^{-7}/°$ C.; less than $7.0 \times 10^{-7}/°$ C., or even less than $6.0 \times 10^{-7}/°$ C. In another aspect, the coefficient of thermal expansion (CTE) in the axial direction can be in the range of from $8.0 \times 10^{-7}/°$ C. to $10.0 \times 10^{-7}/°$ C. across the temperature range of from 25° C. to 800° C.

The CTE of the inventive bodies is in one aspect lower than the mean lattice CTE of cordierite, which is typically about $15.0 \times 10^{-7}/°$ C. to $18.0 \times 10^{-7}/°$ C., due to microcracking in the structure. Optionally, the cordierite body may also exhibit a preferred, non-random crystallographic orientation of the cordierite crystallites that comprise the body. When the body has a tubular, cellular, or honeycomb type geometry, it is preferred that the cordierite crystals are preferentially oriented with their crystallographic c-axes lying within a plane that is parallel to the formed surface of the walls of the body. This preferred orientation of the crystallites contributes to a reduction in the thermal expansion of the body as measured along a direction parallel to the surface of the walls because cordierite exhibits a negative CTE in the direction of the crystal c-axis.

In still another aspect, the ceramic composition of the present invention can exhibit relatively high bulk densities which, as will be appreciated by one of ordinary skill in the art, can translate into a relatively higher volumetric heat capacity. A higher volumetric heat capacity further indicates a ceramic article having a better survivability in use. To that end, in one aspect, the ceramic compositions of the present invention can exhibit a bulk density in the range of from approximately 200 g/L to approximately 900 g/L, including exemplary densities of 300 g/L, 400 g/L, 500 g/L, 600 g/L, 700 g/L, and 800 g/L. In still another aspect, the bulk density can be in a range derived from any of the aforementioned values, including for example, a bulk density in the range of from 400 g/L to 900 g/L.

The ceramic bodies of the present invention can have any shape or geometry suitable for a particular application. In high temperature filtration applications, such as diesel particulate filtration, for which the inventive bodies are especially suited, it is preferred the bodies to have a multicellular structure, such as that of a honeycomb monolith.

An exemplary honeycomb structure can have an inlet and outlet end or face, and a multiplicity of cells extending from the inlet end to the outlet end, the cells having porous walls. The honeycomb structure can further have cellular densities from 70 cells/in$^2$ (10.9 cells/cm$^2$) to 400 cells/in$^2$ (62 cells/cm$^2$). A portion of the cells at the inlet end or face end can, in one aspect, be plugged with a paste having same or similar composition to that of the honeycomb structure, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. A preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

Cordierite diesel particulate filters having lower pressure drop, in combination with high filtration efficiency, as well as improved strength have been obtained by the present invention, relative to cordierite filters of the prior art. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

The pressure drop increase at a given loading of soot (in grams/liter) depends upon the geometry of the filter, the permeability of the ceramic wall, and the permeability of the accumulated soot layer. Geometric factors that influence pressure drop include the length and diameter of the filter, the depth of the plugs at the ends of the filter, the number of cells per unit area, and the thickness of the walls. The permeability of the clean ceramic wall, prior to soot loading, is controlled by the porosity, pore size distribution, and pore connectivity. Furthermore, during the initial stages of soot loading, some of the soot enters into the pores on the surface of the ceramic wall. This reduces the permeability of the wall compared to the permeability of the clean wall prior to the deposition of any soot. This reduction in permeability increases the pressure drop through the filter. During these initial stages of soot loading, the extent to which the pressure drop is increased at a given soot loading depends upon the permeability of the soot that resides within the pores of the filter wall. The permeability of the soot within the pores of the ceramic wall, in turn, depends upon how densely the soot particles are packed within the pore. Soot particles that are packed more densely will result in a lower permeability of gas through the soot within the pores, and, thus, a lower permeability through the wall within which the soot resides. It has been found that the density of the packing of the soot in the wall and, thus, the permeability of the wall containing the soot, are also influenced by the porosity, pore size distribution and pore connectivity of the ceramic comprising the wall. Thus, the porosity, pore size distribution and pore connectivity influence the pressure drop of the clean and soot-loaded filter, which, in turn, affects the fuel economy and efficiency of the diesel engine.

Once the surface pores in the wall of the filter have been filled with soot, additional soot accumulates primarily on the surface of the wall, forming a layer of soot that progressively thickens with further deposition of soot. The low permeability of this soot layer results in a further increase in pressure drop.

In addition to lower pressure drop, other advantages of the present invention include high filtration efficiencies, and improved strength relative to higher porosity filtering structures. This is due to the unique combination of porosity, median pore diameter, and pore size distribution described above in relation to the porosity factor.

The invention also provides a method for fabricating the inventive cordierite bodies described above. To this end, it has now been discovered that a ceramic article having the aforementioned microstructure can be achieved from a ceramic precursor batch composition which comprises potato starch as the pore former. Accordingly, the method of the present invention generally comprises the steps of first providing a plasticized ceramic precursor batch composition comprising inorganic ceramic forming batch component(s), a potato starch pore former, a liquid vehicle, and a binder system. A green body having a desired shape can be formed from the plasticized ceramic precursor batch composition. The formed green body can then be fired under conditions effective to convert the green body into a ceramic article.

The inorganic batch components can be any combination of inorganic components which can, upon firing, provide a primary sintered phase composition comprised of ceramic, glass-ceramic, glass, or combinations thereof. Thus, it should be understood that, as used herein, combinations of glass, ceramic, and/or glass-ceramic compositions includes both physical and/or chemical combinations, e.g., mixtures or composites.

Exemplary and non-limiting inorganic batch components suitable for use in preparing these inorganic ceramic powder batch mixtures can include cordierite, mullite, clay, kaolin, magnesium oxide sources, talc, zircon, zirconia, spinel, alumina forming sources, including aluminas and their precursors, silica forming sources, including silicas and their precursors, silicates, aluminates, lithium aluminosilicates, alumina silica, feldspar, titania, fused silica, nitrides, carbides, borides, e.g., silicon carbide, silicon nitride or mixtures of these.

In one aspect, inorganic batch components can be selected from a magnesium oxide source; an alumina-forming source; and a silica source and can further be selected so as to yield a ceramic article comprising cordierite, mullite, or a mixture thereof upon firing. For example, and without limitation, in one aspect, the inorganic batch components can be selected to provide a ceramic article which comprises at least about 93% by weight cordierite, the cordierite consisting essentially of from about 49 to about 53 percent by weight $SiO_2$, from about 33 to about 38 percent by weight $Al_2O_3$, and from about 12 to about 16 percent by weight MgO. To this end, an exemplary inorganic cordierite precursor powder batch composition can comprise about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite are those disclosed in U.S. Pat. No. 3,885,977 which is incorporated herein by reference.

The inorganic ceramic batch components can also be synthetically produced materials such as oxides, hydroxides, and the like. Alternatively, they can be naturally occurring minerals such as clays, talcs, or any combination thereof. Thus, it should be understood that the present invention is not limited to any particular types of powders or raw materials, as such can be selected depending on the properties desired in the final ceramic body.

In one aspect, an exemplary and non-limiting magnesium oxide source can comprise talc. In a further aspect, suitable talcs can comprise talc having a mean particle size of at least about 5 μm, at least about 8 μm, at least about 12 μm, or even at least about 15 μm. In still a further aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possesses a morphology index greater than about 0.50, 0.60, 0.70, or 80. To this end, the morphology index, as disclosed in U.S. Pat. No. 5,141,686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection. Examples of commercially available magnesium oxide sources suitable for use in the present invention include, without limitation, Mistron 002 and/or FCOR Talc, both available from Luzenac, Inc. of Oakville, Ontario, Canada, and 96-67 Talc available from Barrett's Minerals, Inc. of Dillon, Mont.

Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, such as the Alcan C-700 series, having a particle size of about 4-6 micrometers, and a surface area of about 0.5-1 $m^2/g$, e.g., C-714 and C-701™. Relatively fine aluminas, having a particle size of about 0.5-2 micrometers, and a surface area of about 8-11 $m^2/g$, can also be used, such as A10 and A-16SG alumina, available from Almatis. In still another aspect, the alumina forming source can be a colloidal alumina having particles sizes in the range of from 20 nm to 50 nm, such as the AL20 available from Nyacol.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 m²/g. Alternatively, a dispersible alumina source can have a specific surface area of at least 50 m²/g. In an exemplary aspect, a suitable dispersible alumina source for use in the methods of the instant invention comprises alpha aluminum oxide hydroxide (AlOOH.x.H$_2$O) commonly referred to as boehmite, pseudo-boehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the present invention include, without limitation, Dispal Boehmite, commercially available from CONDEA Vista Company of Houston, Tex., and Alpha Alumina A1000, commercially available from Almatis, Inc.

Suitable silica sources can in one aspect comprise clay or mixtures, such as for example, raw kaolin, calcined kaolin, and/or mixtures thereof. Exemplary and non-limiting clays include non-delaminated kaolinite raw clay, having a particle size of about 7-9 micrometers, and a surface area of about 5-7 m²/g, such as Hydrite MP™, those having a particle size of about 2-5 micrometers, and a surface area of about 10-14 m²/g, such as Hydrite PX™ and K-10 raw clay, delaminated kaolinite having a particle size of about 1-3 micrometers, and a surface area of about 13-17 m²/g, such as KAOPAQUE-10™, calcined clay, having a particle size of about 1-3 micrometers, and a surface area of about 6-8 m²/g, such as Glomax LL. All of the above named materials are available from Dry Branch Kaolin, Dry Branch, Ga.

In a further aspect, it should also be understood that the silica forming source can further comprise, if desired a silica raw material including fused SiO$_2$; colloidal silica; crystalline silica, such as quartz or cristobalite, or a low-alumina substantially alkali-free zeolite. To this end, a commercially available quartz silica forming source includes, without limitation, Cerasil 300, Unimim Silverbond 200, and Imsil A25 Silica available from, Laguna Clay Co., of Byesville, Ohio. Further, in still another aspect, the silica forming source can comprise a compound that forms free silica when heated, such as for example, silicic acid or a silicon organo-metallic compound.

As set forth above, the plasticized ceramic precursor batch composition further comprises a potato starch pore former. As will be appreciated by one of ordinary skill in the art, a pore former is a fugitive particulate material which evaporates or undergoes vaporization by combustion during drying or heating of the green body to obtain a desired, usually larger porosity and/or coarser median pore diameter than would otherwise be obtained. Conventional pore formers can be any particulate substance that "burns out" of the formed green body during the firing step and can include such exemplary and non-limiting burnout agents as elemental carbon, graphite, cellulose, flour, and the like. While the plasticized ceramic precursor batch composition of the present invention can optionally comprise any one or more conventional pore formers set forth above, it has been discovered that the use of potato starch pore former enables the manufacture of ceramic articles possessing the unique combination of microstructure and physical properties described above.

A suitable potato starch for use in the instant method can, in one aspect, exhibit a relatively narrow particle size distribution having a $dp_{breadth}$ particle size fraction that is less then 1.0, less than 0.9, or even less than 0.8. As used herein, the $dp_{breadth}$ particle size fraction is expressed as the quantity $(dp_{90}-dp_{10})/dp_{50}$, wherein the quantity $dp_{50}$ is the median particle size of the potato starch and is measured in micrometers. The quantity $dp_{90}$ is the particle diameter at which 90% of the particle volume is comprised of particles whose diameters are smaller than the value of $dp_{90}$. Still further, the quantity $dp_{10}$ is the particle diameter at which 10% of the particle volume is comprised of particles whose diameters are smaller than the value of $dp_{10}$. The values of $dp_{10}$ and $dp_{90}$ are also expressed in units of micrometers.

In one aspect, a suitable potato starch can be a Katakuriko potato starch. To that end, the desired particle size distribution as described above can be obtained by, for example, filtering, sifting, centrifuging, or spray drying a Katakuriko potato starch to obtain a desired particle size distribution. Alternatively, a Katakuriko potato starch having the desired particle size distribution can be commercially obtained. For example, an exemplary commercially available potato starch that is suitable for use in the method of the invention includes, without limitation, Katakuriko potato starch, available as Shirakiku brand from Nishimoto Trading Company LTD, 13409 Orden Drive, Santa Fe Springs, Calif. 90670-6336.

In still another aspect of the present invention, the potato starch formers described herein enable the production of a high porosity ceramic compositions as described herein while minimizing the amount of pore former required in the plasticized ceramic precursor batch compositions. For example, in one aspect, the plasticized batch composition can comprise a potato starch pore former in an amount in the range of from 10 wt. % to 30 wt. % relative to the total weight of the inorganic batch components, including weight percentages of 15%, 20%, and 25% In still another aspect, the plasticized batch composition can comprise a potato starch pore former in an amount in the range of from 15 wt. % to 25 wt. % relative to the total weight of the inorganic batch components, including exemplary weight percentages of 17%, 19%, 21% and 23%.

The inorganic batch components and the pore former component can be intimately blended with a liquid vehicle and forming aids which impart plastic formability and green strength to the raw materials when they are shaped into a body. The forming aids can comprise any one or more of a plasticizer, lubricant, binder, oil, dispersant, and/or a cross-linking agent. Forming may be done by, for example, molding or extrusion. When forming is done by extrusion, most typically a cellulose ether binder such as methylcellulose, hydroxypropyl methylcellulose, methylcellulose derivatives, and/or any combinations thereof, serve as a binder, and sodium stearate serves as a lubricant. An exemplary cellulose ether binder can include Methocel® F240, available from Dow Chemical Co. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to in part optimum handling properties and compatibility with the other components in the ceramic batch mixture. Typically, the liquid vehicle content is usually in the range of from 20% to 50% by weight of the plasticized composition. In one aspect, the liquid vehicle component can comprise water. In another aspect, depending on the component parts of the ceramic batch composition, it should be understood that organic solvents such as, for example, methanol, ethanol, or a mixture thereof can be used as the liquid vehicle.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic structures are in one aspect especially suited for use as diesel particulate filters. Specifically, the inventive ceramic bodies are especially suited as multi-cellular honeycomb structures having a high filter volumetric heat capacity, a low pressure drop between the entrance and exit faces of the filter, a low CTE, and a high filtration efficiency. To this end, in one aspect the plasticized ceramic precursor batch composition can be formed or otherwise shaped into a honeycomb configuration. Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon such as a square or an octagon, a circle, an ellipse, or the like.

Some examples of ceramic honeycombs produced by the process of the present invention generally comprise cell densities in the of range from 235 cells/cm$^2$ (about 1500 cells/in$^2$) to 15 cells/cm$^2$ (about 100 cells/in$^2$), including those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Further, the wall or web thicknesses typically range from about 0.07 to about 0.6 mm (about 3 to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. For example, honeycombs structures having about 15 to about 30 cells/cm$^2$ (about 100 to about 200 cells/in$^2$) and about 0.30 to about 0.64 mm (about 12 to about 25 mil) wall thicknesses are well suited for diesel particulate filter applications.

The formed green body having a desired size and shape as described above can then be dried to remove excess moisture. The drying step can be performed by hot air, microwave, steam, or dielectric drying, which can be followed by ambient air drying. Once dried, the green body can thereafter be fired under conditions effective to convert the green body into a ceramic article comprising a primary crystalline phase ceramic composition as described below.

The firing conditions effective to convert the green body into a ceramic article can vary depending on the process conditions such as, for example, the specific composition, size of the green body, and nature of the equipment used. To that end, in one aspect the optimal firing conditions needed to obtain a ceramic article according to the instant invention will be obtainable by one of ordinary skill in the art through no more than mere routine experimentation. Thus, the present invention is not limited to specific firing temperatures and times. However, in one aspect, for plasticized mixtures that are primarily for forming mullite, the firing temperature can range from about 1400° C. to about 1600° C., and the firing times can range from about 1 hour to about 6 hours. Alternatively, for plasticized mixtures that are primarily for forming cordierite, the firing conditions comprise heating the green body to a soak temperature of between about 1350° C. to about 1450° C., including soak temperatures of at least 1375° C., at least 1380° C., at least 1385° C. at least 1390° C., at least 1395° C., at least 1400° C., at least 1405° C., at least 1410° C., at least 1415° C., at least 1420° C., or even at least 1425° C. In still another aspect, the green body can be fired at a soak temperature in the range of from 1400° C. to 1450° C. In still another aspect, the green body can be fired at a soak temperature in the range of from 1400° C. to 1430° C., including a soak temperature of, for example, 1425° C.

The firing times can also range from approximately 20 to 150 hours, during which a maximum soak temperature can be reached and held for a soak time in the range of from about 5 hours to about 30 hours, including approximate soak times of 6, 7, 8, 9, 10, 11, 12, 13, 14, 15, 16, 17, 18, 19, 20, 21, 22, 23, 24, 25, 26, 27, 28 or 29 hours. In still another aspect, the firing times can range from approximately 20 to 100 hours, also during which a soak temperature can be held for a soak time as detailed above.

As briefly stated above and as further exemplified in the appended examples, the use of the potato starch as a pore former in the plasticized ceramic precursor batch composition of the present invention can enable the use of advantages processing conditions that ultimately can provide a resulting ceramic article having a unique combination of microstructure characteristics and performance properties. For example, in one aspect, the use of the potato starch enables a reduction in the required firing cycle time by eliminating the firing cycle hold periods required for conventional pore-former burnout. Accordingly, the firing cycle suitable for firing the ceramic precursor batch composition of the present invention can comprise a relatively slower ramp rate. By utilizing the slower ramp rate a lower coefficient of thermal expansion can be obtained while still obtaining acceptable microstructure characteristics. To this end, exemplary non-limiting firing schedules, including maximum soak temperature, soak time, and ramp rates are set forth in Table 1 below and are graphically illustrated in appended FIG. 1.

TABLE 1

| | Soak Temperature/Time | | | |
|---|---|---|---|---|
| | 1410° C./ 18 hr | 1420° C./ 15 hr | 1410° C./ 13 hr | 1425° C./ 16 hr |
| 840-950° C. Heating Rate (° C./h) | 110 | 75 | 75 | 27 |
| 1150-1200° C. Heating Rate (° C./h) | 40 | 20 | 25 | 44 |

TABLE 1-continued

| | Soak Temperature/Time | | | |
|---|---|---|---|---|
| | 1410° C./ 18 hr | 1420° C./ 15 hr | 1410° C./ 13 hr | 1425° C./ 16 hr |
| 1200-1360° C. Heating Rate (° C./h) | 30 | 50 | 25 | 44 |
| 1360-1400° C. Heating Rate (° C./h) | 30 | 50 | 5 | 44 |
| Maximum Temperature (° C.) | 1410 | 1420 | 1410 | 1425 |

Examples

To further illustrate the principles of the present invention, the following examples are put forth so as to provide those of ordinary skill in the art with a complete disclosure and description of how the ceramic articles and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

It should also be understood that while the present invention has been described in detail with respect to certain illustrative and specific aspects thereof, it should not be considered limited to such, as numerous modifications are possible without departing from the broad spirit and scope of the present invention as defined in the appended claims.

A series of inventive cordierite honeycomb structures were prepared using various combinations of starting raw materials, including, powdered talc, kaolin, alumina-forming sources, silica sources, binder, pore former, liquid vehicle, lubricant and/or surfactant. The specific inventive plasticized precursor batch compositions used to prepare the cordierite honeycomb structures are set forth in Table 2.

TABLE 2

| | Inventive | | | |
|---|---|---|---|---|
| Composition | A | B | C | D |
| F-Cor Talc - 325 | 38.52 | 38.52 | 28.89 | 38.52 |
| F-Cor Talc - Coarse | — | — | 9.63 | — |
| Silverbond 200 | 15.38 | 15.38 | 15.38 | 15.38 |
| Cerasil 300 Quartz | — | — | — | — |
| Almatis A10 Alumina | 12.27 | 12.27 | 10.47 | 12.27 |
| Aluminum Trihydrate (Alcan C-714) | 20.99 | 20.99 | 20.99 | 20.99 |
| Hydrite MP | 12.84 | 12.84 | 12.84 | 12.84 |
| Potato Starch | 20.0 | 30.0 | 30.0 | 20.0 |
| Nyacol AL20 | — | — | 18.0 | — |
| Emulsia "2T" * | — | — | 8.00 | — |
| Methocel (F240) | 3.89 | 3.89 | 3.2 | 3.89 |
| Liga (Sodium Stearate) | 0.55 | 0.55 | 1.0 | 0.55 |
| Berset 2700 crosslinker ** | — | — | 3.0 | — |

\* Emulsia "2T" is a mixture of 100 parts by weight water, 2.02 parts by weight of 97.0% Triethanolamine, and 13.47 parts by weight Tall oil
\*\* Berset 2700 is commercially available from Bercen, Inc., Cranston Rhode Island, USA.

The dry batch components of Table 2 were first intimately mixed with the pore former. The liquid addition, including the binders and any liquid vehicle, was then added to the mixture of dry batch components and pore former and mulled together in a large muller for approximately 5-20 minutes to provide a final plasticized ceramic batch composition.

Each of the plasticized batches was then extruded under conditions suitable to form wet or green honeycomb bodies (wares) having cell geometries comprises of approximately 200-300 cells per square inch and cell wall thicknesses of about 12 to 16 milli-inches. These wet or green honeycomb wares were then dried in a humidity controlled microwave oven to reach greater than approximately 90% drying. The dried green wares were then further dried in a forced air furnace for approximately two more hours. A gas furnace was then used to fire the green bodies and to form the ceramic cordierite crystals. The firing schedules used for each of the batch compositions are set forth in Table 3 below.

TABLE 3

| | Examples | |
|---|---|---|
| | A, B, C | D |
| Soak Temperature/Time | 1410° C./13 hr | 1425° C./16 hr |
| 840-950° C. Heating Rate (° C./h) | 75 | 27 |
| 1150-1200° C. Heating Rate (° C./h) | 25 | 44 |
| 1200-1360° C. Heating Rate (° C./h) | 25 | 44 |
| 1360-1400° C. Heating Rate (° C./h) | 5 | 44 |
| Maximum Temperature (° C.) | 1410 | 1425 |

The resulting inventive ceramic bodies were then evaluated to determine their relevant physical properties, such as for example, CTE, total porosity, median pore diameter, pore size distribution, backpressure, and modulus of rupture. CTE was measured by dilatometry in the axial direction (parallel to the cell channels). All measurements of pore microstructure were made by mercury porosimetry. The modulus of rupture (MOR) was measured in the axial direction by the four-point method. To that end, the MOR results reported for Examples A, B, and C were obtained from rod samples. Example D is based on a cellular geometry of 275 cpsi and a 14 mil wall. The results of these tests are reported in Table 4 and are discussed below.

TABLE 4

| | Inventive Example # | | | |
|---|---|---|---|---|
| | A | B | C | D |
| Axial CTE ($10^{-7}$/° C.) | 8.50 | 8.60 | 9.10 | 8.2 |
| % Porosity | 63.44 | 66.73 | 66.94 | 62.33 |
| $d_{10}$ | 12.46 | 15.59 | 16.83 | 11.84. |
| $d_{50}$ | 21.31 | 26.53 | 28.07 | 21.69 |
| $d_{90}$ | 34.59 | 46.39 | 56.10 | 38.89 |
| $d_{factor}$ | 0.42 | 0.41 | 0.40 | 0.45 |
| $d_{breadth}$ | 1.04 | 1.16 | 1.40 | 1.25 |
| Modulus of Rupture (psi) | 844 | 663 | 548 | 328 |

An examination of the data set forth in Table 4 indicates the ability for an inventive batch composition of the present invention to provide a resulting fired ceramic body having the unique combination of pore microstructure and performance properties described herein. Further, it can also be seen that said combination was achievable while minimizing the amount of pore former present in the plasticized precursor batch compositions.

Still further, a series of SEM micrographs were obtained for the honeycomb article produced from the inventive composition A and are depicted here in as FIGS. 2-5. An examination of the SEM micrographs indicates the inventive composition provides a highly porous microstructure that also appears to have a high level of connectivity. Furthermore, the surface porosity also appears to be very high, tending to reduce the level of undesired backpressure.

A subsequent comparative study was conducted to compare the back pressure characteristics of a ceramic honeycomb article manufactured from inventive batch composition A and a bench mark comparative high porosity composition manufactured from a batch composition having approximately 80% graphite pore former. The batch composition used to prepare the comparative article is set forth in Table 5 below:

TABLE 5

Comparative Example

| Composition | |
|---|---|
| F-Cor Talc - 325 | 38.52 |
| F-Cor Talc - Coarse | — |
| Silverbond 200 | 15.38 |
| Cerasil 300 Quartz | — |
| Almatis A10 Alumina | 12.27 |
| Aluminum Trihydrate (Alcan C-714) | 20.99 |
| Hydrite MP | 12.84 |
| Graphite Pore Former | 80.0 |
| Nyacol AL20 | — |
| Emulsa "2T" | — |
| Methocel (F240) | 4.45 |
| Liga (Sodium Stearate) | 0.56 |
| Berset 2700 crosslinker | — |

Figure 6:
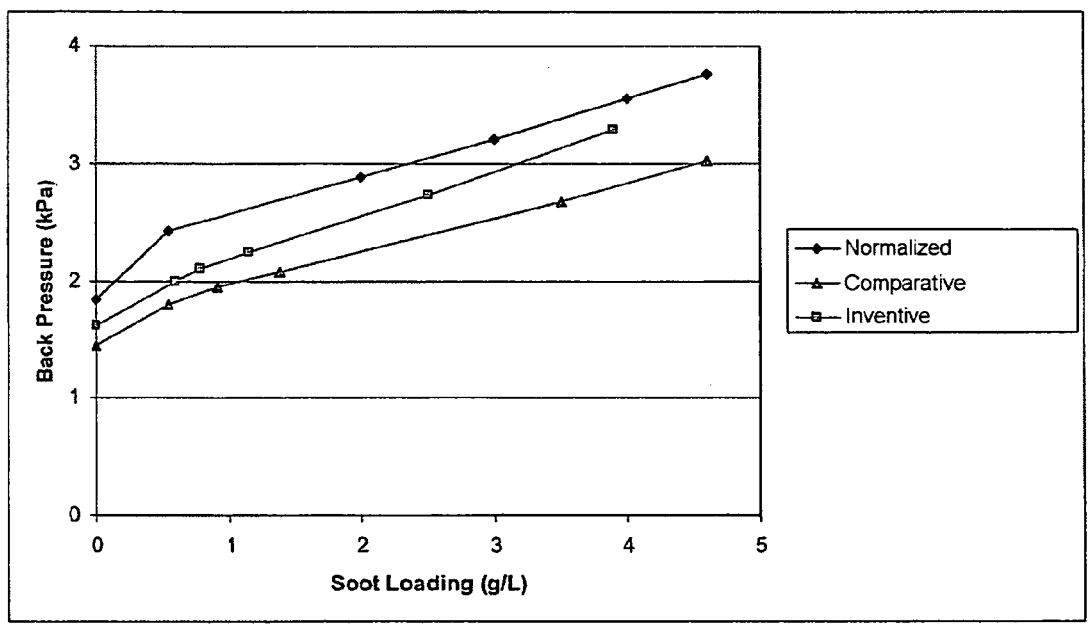
FIG. 6 is graph comparison of backpressure data obtained for a ceramic compositions according to one aspect of the present invention.

In particular, the resulting back pressures where measured at varying soot loadings ranging from 0 to 5 grams per liter. Due to a difference in cell geometries between the two honeycomb articles tested (258/16 and 260/10), a lower back pressure was initially expected and observed from the benchmark comparative composition. However, upon normalizing the benchmark sample to the same relative geometry as that of the inventive composition, the reduction in backpressure achieved by the inventive composition can be observed. Specifically, as illustrated in FIG. 6, it can be seen that, for example, at the 4 g/L soot loading, the inventive composition exhibited approximately 8-10% lower backpressure than the normalized comparative high porosity composition.

What is claimed is:

1. A ceramic honeycomb structure, comprising a porous cordierite composition, having a total porosity (% P) greater than 65%; a pore size distribution ($d_{factor}$) less than 0.4, a median pore size greater than 10 microns; and a coefficient of thermal expansion in the axial direction less than $10.0 \times 10^{-7}/°$ C. across the temperature range of from 25° C. to 800° C., wherein $d_{factor}=(d_{50}-d_{10})/d_{50}$.

2. The ceramic honeycomb structure of claim 1, wherein the total porosity % P is in the range of from greater than 65% to less than 75%.

3. The ceramic honeycomb of claim 1, wherein the total porosity P has a median pore size diameter in the range of from 15 µm to 30 µm.

4. The ceramic honeycomb structure of claim 1, wherein the coefficient of thermal expansion is less than $9.0 \times 10^{-7}/°$ C. across the temperature range of from 25° C. to 800° C.

5. The ceramic honeycomb structure of claim 1, wherein the coefficient of thermal expansion is in the range of from $8.0 \times 10^{-7}/°$ C. to $10.0 \times 10^{-7}/°$ C. across the temperature range of from 25° C. to 800° C.

6. The ceramic honeycomb structure of claim 1, wherein the pore size distribution ($d_{factor}$) is less than 0.35.

7. The ceramic honeycomb structure of claim 1, wherein the pore size distribution ($d_{factor}$) is in the range of from 0.30 to less than 0.40.

8. The ceramic honeycomb structure of claim 1, further exhibiting a bulk density in the range of from 200 g/l to 900 g/l.

9. The ceramic honeycomb structure of claim 8, wherein the bulk density is in the range of from 400 g/l to 500 g/l.

10. A method for manufacturing a ceramic honeycomb article, comprising the steps of:
   providing a plasticized cordierite precursor batch composition containing:
      inorganic batch components selected from a magnesium oxide source; an alumina-forming source; and a silica source;
      a pore former comprising a potato starch having a $dp_{breadth}$ less than 1.00, wherein $dp_{breadth}=(dp_{90}-dp_{10})/dp_{50}$;
      a liquid vehicle; and
      a binder;
   forming a honeycomb green body from the plasticized cordierite precursor batch composition; and
   firing the honeycomb green body under conditions effective to convert the green body into a porous ceramic honeycomb article containing cordierite and having a total porosity (% P) greater than 60%; a pore size distribution ($d_{factor}$) less than 0.5, a median pore size greater than 10 microns; and a coefficient of thermal expansion in the axial direction less than $10.0 \times 10^{-7}/°$ C. across the temperature range of from 25° C. to 800° C.

11. The method of claim 10, wherein the pore former comprises Katakuriko potato starch.

12. The method of claim 10, wherein the potato starch is present in an amount of from 10 wt. % to 30 wt. % relative to the total weight of the inorganic batch components.

13. The method of claim 12, wherein the potato starch is present in an amount of from 15 wt % to 25 wt. % relative to the total weight of the inorganic batch components.

14. The method of claim 10, wherein the potato starch has a $dp_{breadth}$ less than 0.9.

15. The method of claim 10, wherein the inorganic batch components are selected to provide a sintered phase cordierite composition as characterized on an oxide weight basis, consisting essentially of:
   about 49 to about 53 percent by weight $SiO_2$,
   about 33 to about 38 percent by weight $Al_2O_3$, and
   about 12 to about 16 percent by weight MgO.

16. The method of claim 10, wherein the effective firing conditions comprise firing the honeycomb green body at a soak temperature in range of from 1350° C. to 1450° C. and subsequently holding the soak temperature for a period of time sufficient to convert the honeycomb green body into a ceramic honeycomb article.

17. The method of claim 16, wherein the soak temperature is in the range of from approximately 1400° C. to approximately 1430° C.

18. The method of claim 10, wherein the effective firing conditions comprise a firing schedule having a total duration in the range of from 20 to 100 hours.

19. A ceramic article manufactured by the method of claim 10.

* * * * *